United States Patent
Yadav

(10) Patent No.: US 9,987,950 B2
(45) Date of Patent: Jun. 5, 2018

(54) VEHICLE SEAT ELECTRICAL CONNECTOR BRACKET ASSEMBLY

(71) Applicant: Ford Global Technologies, LLC, Dearborn, MI (US)

(72) Inventor: Shailendra Yadav, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/133,577

(22) Filed: Apr. 20, 2016

(65) Prior Publication Data
US 2017/0305303 A1    Oct. 26, 2017

(51) Int. Cl.
*B60N 2/02* (2006.01)
*B60N 2/68* (2006.01)
*F16M 13/02* (2006.01)
*H01R 13/73* (2006.01)

(52) U.S. Cl.
CPC ............. *B60N 2/0232* (2013.01); *B60N 2/68* (2013.01); *F16M 13/02* (2013.01); *H01R 13/73* (2013.01); *B60N 2002/024* (2013.01); *H01R 2201/10* (2013.01)

(58) Field of Classification Search
CPC ... B60N 2/68; B60N 2/44; B60N 2/42; B60N 2/56; B60N 2/72; B60N 2/686; B60N 2/5621; B60N 2/4228; B60N 2/682; B60R 11/00; B60R 11/02; B60R 2/44
USPC .................. 297/378.1, 188.08, 188.12, 217.3
See application file for complete search history.

(56) References Cited

U.S. PATENT DOCUMENTS

| | | | | |
|---|---|---|---|---|
| 4,844,533 A * | 7/1989 | Dowd | .................... | B60J 3/0208 296/214 |
| 5,428,535 A * | 6/1995 | Katsumata | .......... | B60R 16/0238 361/641 |
| 5,501,605 A * | 3/1996 | Ozaki | ................. | B60R 16/0207 174/72 A |
| 5,877,944 A * | 3/1999 | Onizuka | ................ | H01H 85/20 361/644 |
| 6,068,491 A * | 5/2000 | Hofmeister | .......... | H01R 9/2458 439/34 |
| 6,116,916 A * | 9/2000 | Kasai | ..................... | H01R 9/226 361/826 |
| 6,412,874 B1 * | 7/2002 | Mayer | .................... | B60N 2/002 297/452.18 |
| 6,429,544 B1 * | 8/2002 | Sasaki | .................. | B60N 2/0224 307/10.1 |
| 6,720,671 B2 * | 4/2004 | Kondo | ................... | B60N 2/002 174/72 A |

(Continued)

FOREIGN PATENT DOCUMENTS

EP    2141777 A1    6/2010
EP    2330945 B1    4/2014

*Primary Examiner* — Jose V Chen
(74) *Attorney, Agent, or Firm* — Vichit Chea; Price Heneveld LLP

(57) ABSTRACT

A vehicle seat bracket assembly is provided that includes a bracket connected to a vehicle seat structure and including one or more retention features. The vehicle seat bracket assembly also includes an electrical connector module receivably connected to the bracket via the one or more retention features. The vehicle seat bracket assembly further includes one or more electrical control modules connected to the electrical connector module.

18 Claims, 6 Drawing Sheets

(56) References Cited

U.S. PATENT DOCUMENTS

| | | | | |
|---|---|---|---|---|
| 7,182,383 | B2* | 2/2007 | Anderson | B60R 7/04 |
| | | | | 224/311 |
| 7,561,445 | B2* | 7/2009 | Yajima | B60K 6/445 |
| | | | | 174/72 A |
| 7,769,346 | B1* | 8/2010 | Van Order | B60R 11/0264 |
| | | | | 307/10.1 |
| 8,548,687 | B2 | 10/2013 | Jefferies et al. | |
| 9,039,081 | B2* | 5/2015 | Arefi | B60N 2/686 |
| | | | | 297/188.08 |
| 9,079,511 | B2* | 7/2015 | Jefferies | B60N 2/0232 |
| 9,731,636 | B1* | 8/2017 | Takeuchi | B60N 2/442 |
| 2005/0225057 | A1* | 10/2005 | Yamamoto | B60R 11/0264 |
| | | | | 280/727 |
| 2007/0290535 | A1* | 12/2007 | Meredith | B60N 2/42736 |
| | | | | 297/217.1 |
| 2010/0247235 | A1 | 9/2010 | Nishiura et al. | |
| 2011/0109133 | A1* | 5/2011 | Galbreath | A47C 7/748 |
| | | | | 297/217.3 |
| 2013/0333941 | A1 | 12/2013 | Snider | |

\* cited by examiner

VEHICLE SEAT ELECTRICAL CONNECTOR BRACKET ASSEMBLY

FIELD OF THE INVENTION

The present invention generally relates to a bracket assembly, and more specifically to a bracket assembly for supporting electrical components on a vehicle seating assembly.

BACKGROUND OF THE INVENTION

Vehicle seating assemblies may include various actuators such as motors for actuating a seat into a plurality of positions. The actuators are controlled with electrical modules that are typically assembled to the seat, such as by way of a separate bracket on the bottom of the seat pan. It would be desirable to provide for an improved bracket assembly that accommodates electrical modules on a vehicle seat.

SUMMARY OF THE INVENTION

According to one aspect of the present invention, a vehicle seat bracket assembly is provided. The vehicle seat bracket assembly includes a bracket connected to a vehicle seat cushion tube and comprising one or more retention features. The vehicle seat bracket assembly also includes an electrical connector module receivably connected to the bracket via the one or more retention features.

According to another aspect of the present invention, a vehicle seat bracket assembly is provided. The vehicle bracket assembly includes a bracket connected to a vehicle seat cushion tube and comprising one or more retention features, and an electrical connector module receivably connected to the bracket via the one or more retention features. The vehicle bracket assembly also includes one or more electrical control modules connected to the electrical connector module.

According to a further aspect of the present invention, a vehicle seat is provided. The vehicle seat includes a seat structure, a cushion tube assembled to the seat structure, and a bracket connected to the cushion tube and comprising one or more retention features. The vehicle seat also includes an electrical connector module receivably connected to the bracket via the one or more retention features.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
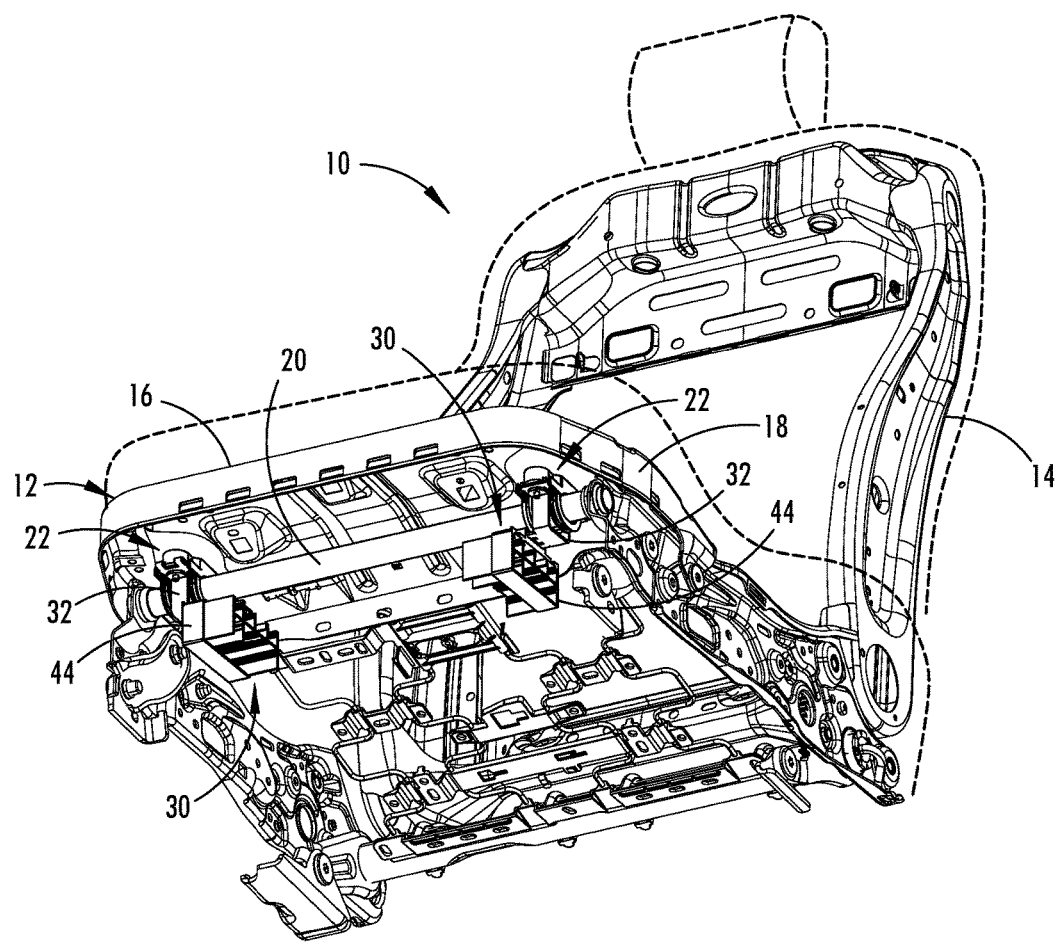
FIG. 1 is a bottom perspective view of a vehicle seating assembly having a bracket assembly, according to a first embodiment.

Referring to the embodiment generally illustrated in FIGS. 1-5, a vehicle seating assembly 10 is illustrated that includes a seat 12 and a seatback 14 configured for use in a motor vehicle for passenger seating. The seatback 14 may pivot at the base relative to the seat 12 via a pivoting assembly. The pivoting assembly may include an assembly of recliner hearts and brackets, for example, as is generally known in the art. The seating assembly 10 may be electrically powered and may be configured with a plurality of actuators and electrical control modules that actuate the seat 12 and the seatback 14 and various mechanisms provided thereon in various directions to move to different positions. For example, the vehicle seating assembly 10 may include electrical motors or other actuators for controlling the position of the vehicle seating assembly 10 on a seat track relative to a mounting base such that the seat 12 may be moved forwards, backwards, up, down or tilted forward or backward at an angle. In addition, the position of the seatback 14 relative to the seat 12 may be adjusted to adjust the inclination angle of the seatback 14. Further, the lumbar support of the seatback 14, the positioning of the seat cushion or portions thereof on the seat 12, and various other actuator controlled mechanisms may be actuated in different directions to desired positions to accommodate various passengers and comfort needs. As such, the vehicle seating assembly 10 and components thereof may move in various directions according to a powered seating arrangement.

To control the various actuators, e.g., motors, the vehicle seating assembly 10 is configured with the various electrical control modules which are installed within one or more electrical connector modules 44 on the bottom side of the seat 12. The electrical connector modules 44 and electrical control modules supported thereon are supported by a bracket assembly 30 as shown and described herein.

The vehicle seating assembly 10 includes a cushion tube 20 located on the bottom side of the seat 12 generally near the front end. The cushion tube 20 is shown as a generally cylindrical tube that supports the seat cushion 16 at the front bottom side of the seat 12. The cushion tube 20 is generally supported on the bottom side of the seat pan frame 18 of the seat 12 by way of a pair of handcuff assemblies 22. The vehicle seating assembly 10 further includes a pair of vehicle seat bracket assemblies 30 that are supported by the handcuff assemblies 22 and support one or more electrical connector modules 44.

In the first embodiment illustrated in FIGS. 1-5, a pair of vehicle bracket assemblies 30 is shown connected to the handcuff brackets 22 near opposite ends of the cushion tube 20. Each vehicle seat bracket assembly 30 includes an outer bracket 32 connected to an inner handcuff assembly 22 and supported by a vehicle seat structure, such as the seat pan frame 18. As such, each outer bracket 32 holds the handcuff assembly 22 onto the cushion tube 20. Each outer bracket 32 has one or more retention features configured to receivably connect with an electrical connector module 44. The vehicle bracket assembly 30 also includes an electrical connector module 44 connected to the outer bracket 32 via the one or more retention features. The electrical connector module 44 is configured with receiver slots 46 for receiving electrical control modules 48 which, in turn, may control the various actuators on the vehicle seating assembly 10.

Figure 2:
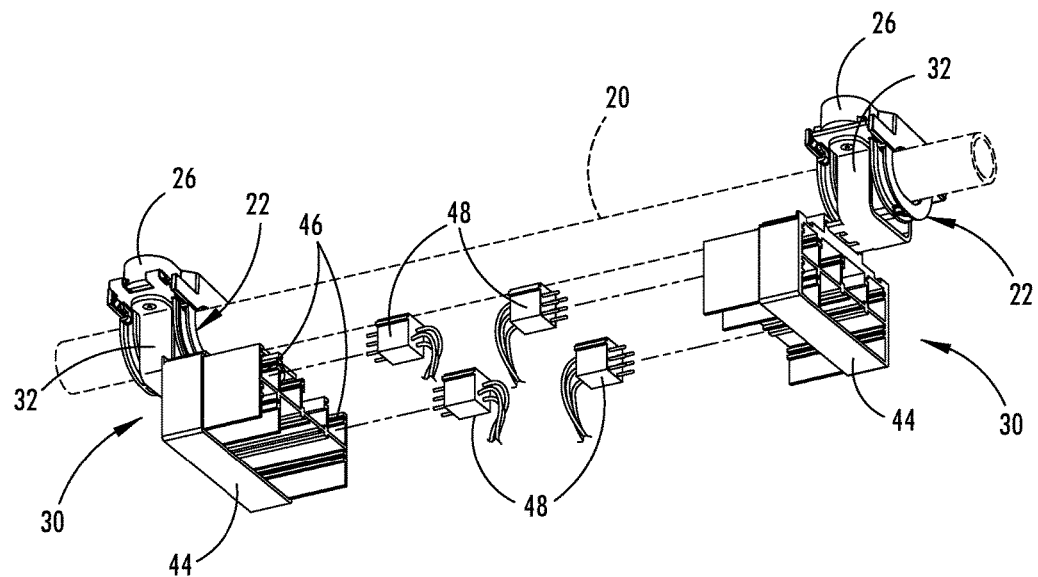
FIG. 2 is an enlarged view of a portion of the seating assembly illustrating the bracket assembly of FIG. 1.
Figure 3:
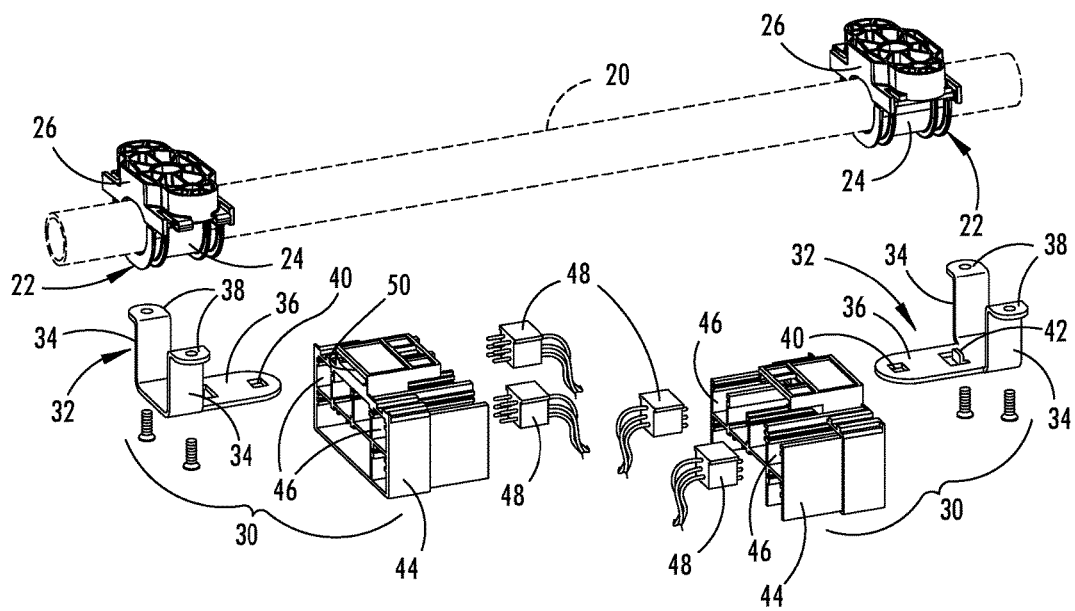
FIG. 3 is an exploded view of the bracket assembly of FIG. 2.
Figure 4:
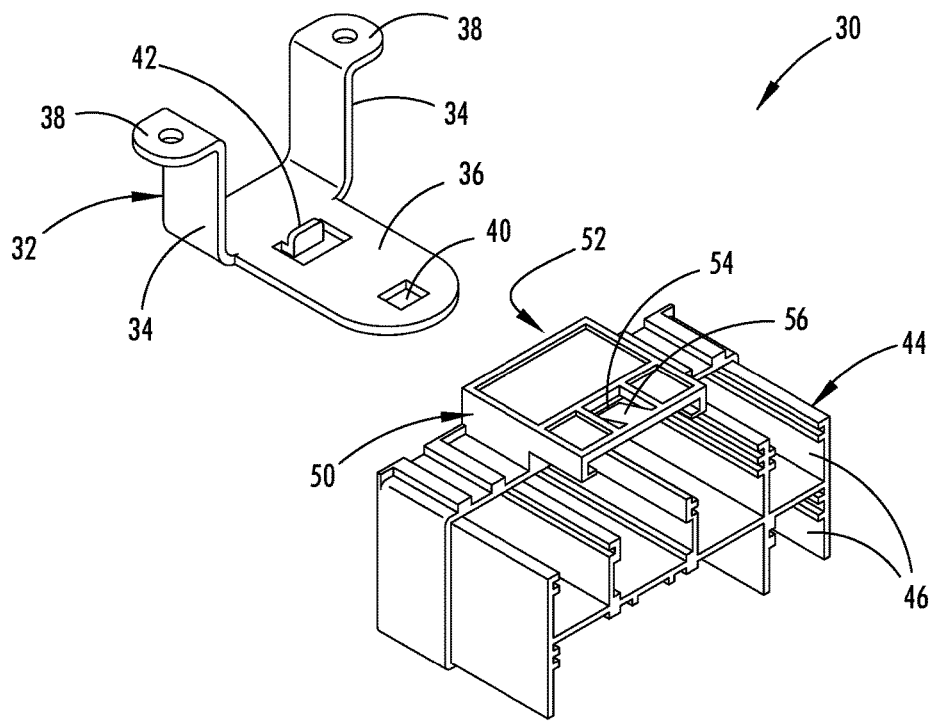
FIG. 4 is an enlarged view of the bracket assembly showing an electrical connector module disconnected from the bracket.

As best seen in FIGS. 2-4, a pair of vehicle seat bracket assemblies 30 is shown mounted near opposite ends of the cushion tube 20. Each vehicle seat bracket assembly 30 includes an outer metal bracket 32 wrapped partially around and fastened to the inner plastic handcuff assembly 22. The plastic handcuff assembly 22 includes a support mounting plate 26 mounted to the underside of the seat pan frame 18 and a clamp 24 that wraps around the cushion tube 20. The outer bracket 32 extends over the clamp 24 and may be fastened onto the plastic handcuff assembly 22.

The vehicle seat bracket assembly 30 employs an outer bracket 32 that serves to retain the inner plastic handcuff assembly 22 onto the cushion tube 20 and also supports one or more electrical connector modules 44. The outer bracket 32 includes a U-shaped portion 34 having mounting plates 38 provided on the top surface thereof. The mounting plates 38 may have openings for receiving fasteners that attach to the support mounting plate 26. The outer bracket 32 also includes a tab portion 36 in the shape of a tongue extending from the U-shaped portion 34. The tab portion 36 serves as a connector for connecting with the electrical connector module 44. The tab portion 36 is shown having one or more snap fit retention features 40, in the form of an opening to form a lancing tab and further has a stop member 42. The stop member 42 may include an upstanding member to limit the forward travel of the electrical connector module 44 towards the tab portion 36 and help maintain a fixed connection of the electrical connector module 44 onto the tab portion 36 of the outer bracket 32. The tab portion 36 is configured to engage a connector within a receiver 50 of the electrical connector module 44.

Figure 5:
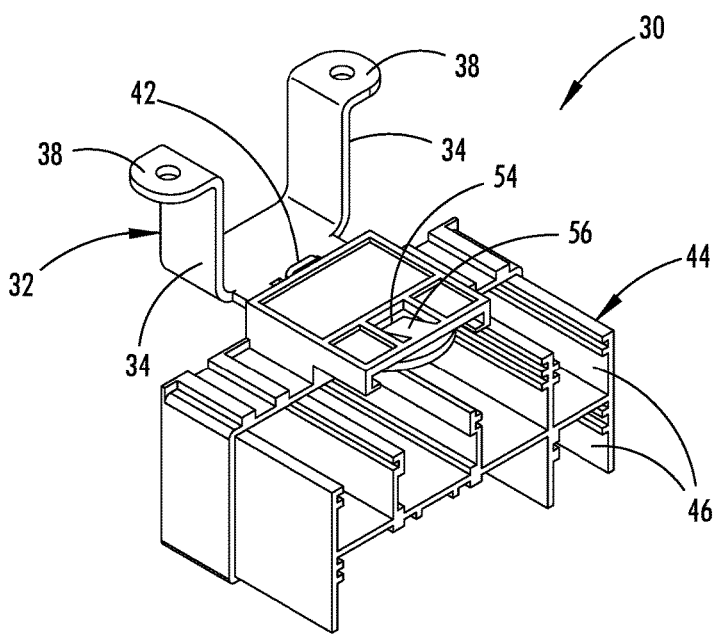
FIG. 5 is an enlarged view of the bracket assembly showing the electrical connector module connected to the bracket.
Figure 6:
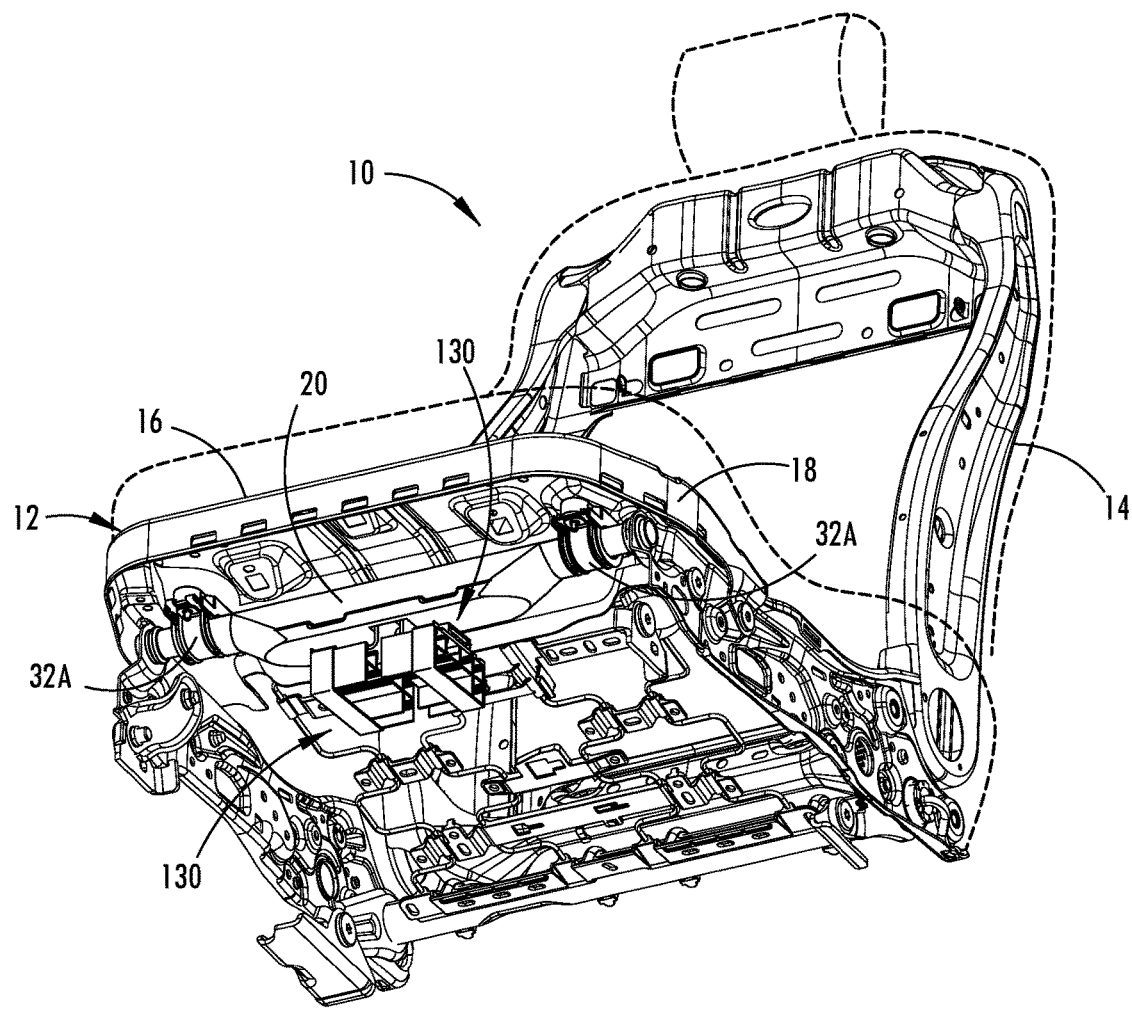
FIG. 6 is a bottom perspective view of a vehicle seating assembly having a bracket assembly, according to a second embodiment.
Figure 7:
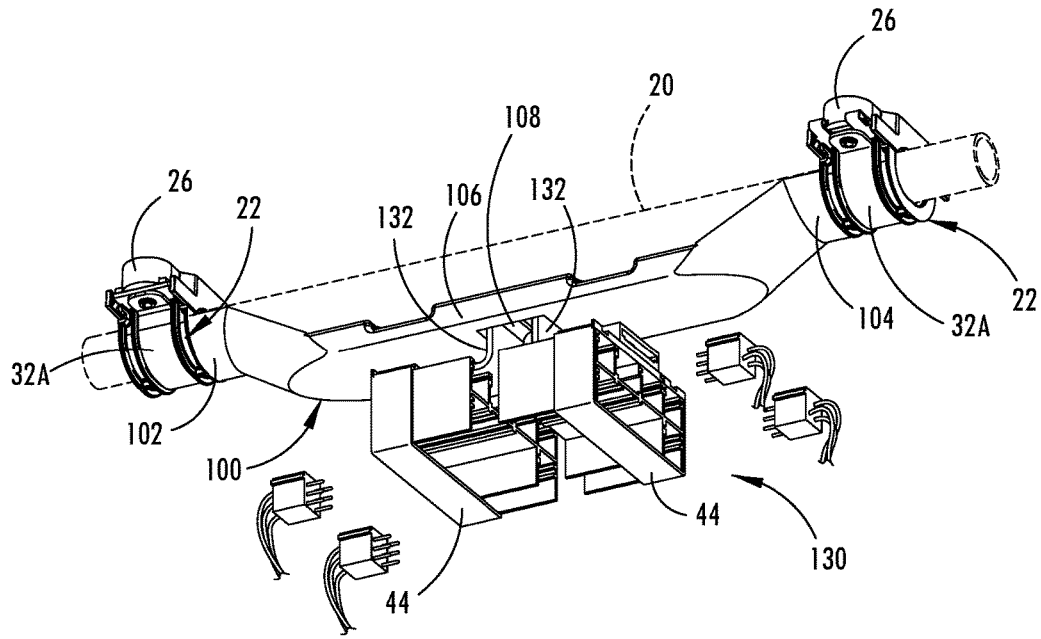
FIG. 7 is an enlarged view of a portion of the seating assembly illustrating the bracket assembly of FIG. 6.
Figure 8:
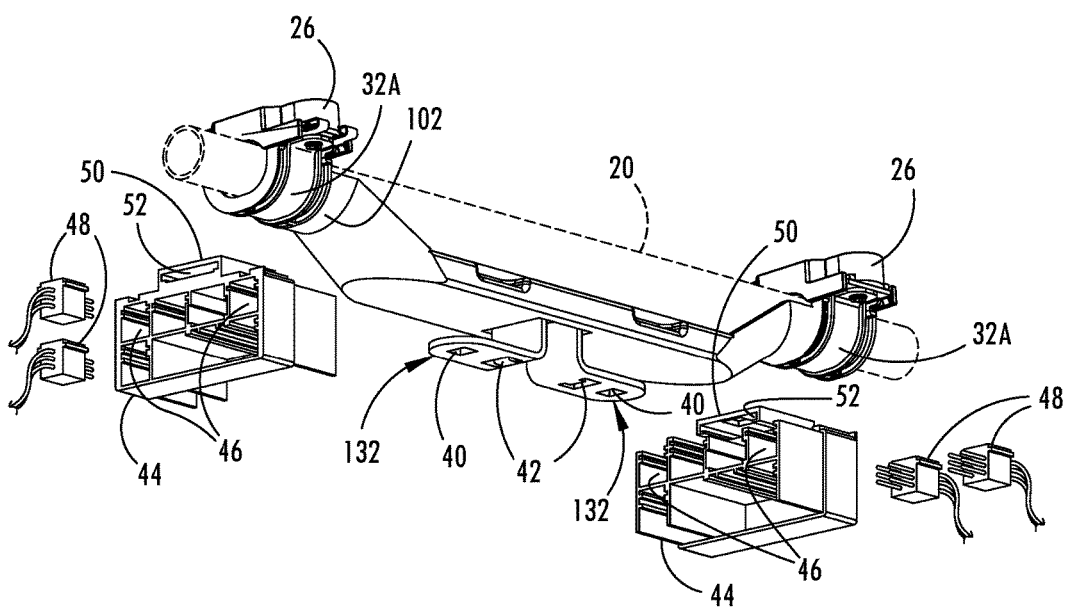
FIG. 8 is an exploded view of the bracket assembly of FIG. 7.

As best seen in FIGS. 4 and 5, the tab portion 36 of bracket 32 may be disposed within opening 52 of the receiver 50 of the electrical connector module 44 during installation of the electrical connector module 44 onto the seat assembly 10. The receiver 50 of the electrical connector module 44 is inserted onto the tab portion 36 to a fully inserted position whereby a forward wall of the receiver 50 contacts the upstanding stop member 42 to limit the travel therein. At the same time, a depressible tab 56 is forcibly depressed downward within opening 54 into snap fit retention feature shown as opening 40 to retain the electrical connector module 44 in position relative to the outer bracket 32 and to prevent undersirable removal of the electrical connector module 44 from the outer bracket 32. The tab 56 may include a member that rotates into a locking position within openings 54 and 40. The tab 56 may provide a snap fit frictional engagement, according to one embodiment. According to other embodiments, the tab 40 may be otherwise configured to maintain the connection of the electrical connector module 44 onto the outer bracket 32. It should further be appreciated that the electrical connector module 44 may receive one or more electrical control modules 48 which may be electrically connected to circuitry for controlling actuators, such as motors and other devices.

As best seen in FIGS. 2 and 3, a plurality of electrical control modules 48 may be installed within the receiver openings 52 of the electrical connector module 44. The electrical control modules 48 may each be configured to control an actuator (e.g., motor) which, in turn, actuates the seat or a component thereof. Examples of electrical control modules 48 includes electrical circuitry such as relays and computer logic packaged in a housing and adapted to be electrically and mechanically connected onto the electrical connector module 44. Each electrical control module 48 may control an actuator to provide two-way (2x) movement and each additional control module 48 may add additional two-way (2x) movement. As such, the total number y of electrical control modules 48 may provide 2·y directional movements of the seat assembly 10.

Referring to FIGS. 6-10, a vehicle seating assembly 10 is illustrated employing a vehicle seat bracket assembly 130, according to a second embodiment. The vehicle seat bracket assembly 130 includes an intermediary support member 100 connected to and supported by both of the two handcuff assemblies 22 located near opposite ends of the cushion tube 20. In the embodiment shown, the intermediary support member 100 extends between the handcuff bracket assemblies 22 and is connected to the handcuff assemblies 22 by way of U-shaped brackets 132. However, it should be appreciated that the intermediary support member 100 may otherwise be integrally formed with the handcuff assemblies 22 or otherwise attached to the handcuff assemblies 22. In this embodiment, the intermediary support member 100 is configured to include one or more brackets 132 for supporting one or more electrical connector modules 44. In the embodiment shown, a pair of brackets 132 is shown connected to a respective pair of electrical connector modules 44. However it should be appreciated that other orientations of the brackets 32 and more than two brackets 132 may be included for holding more than two electrical connector modules 44. The brackets 132 may be connected to the intermediary support member 100 which may be achieved with fasteners or other support mechanisms. Alternatively, the brackets 132 may be molded into the intermediary support member 100 or snap fit connected thereto.

Figure 9:
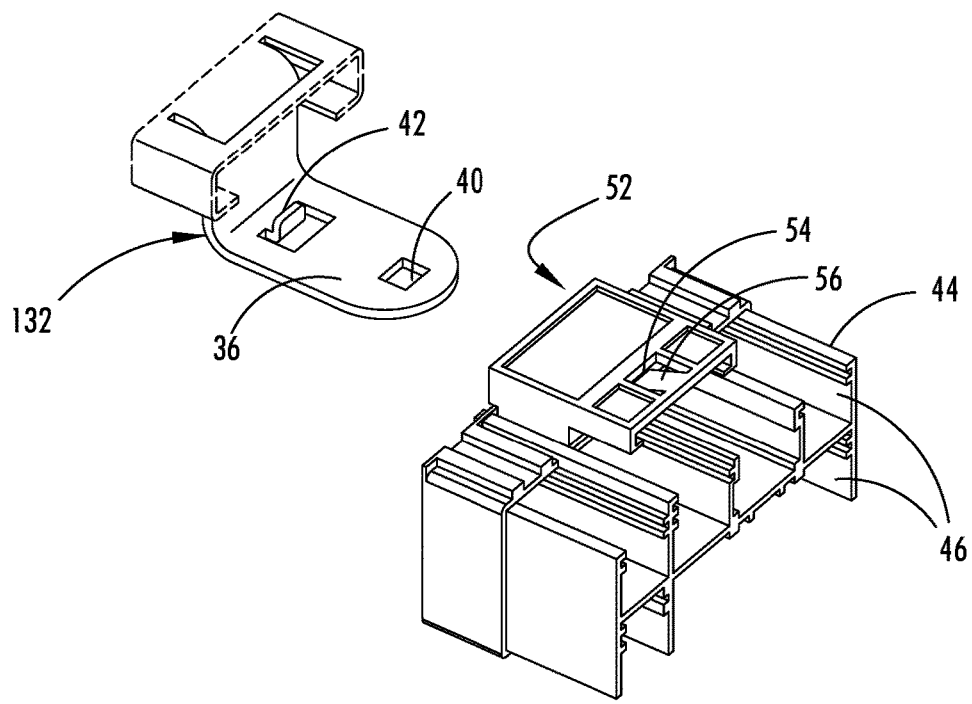
FIG. 9 is an enlarged view of the bracket assembly showing the electrical connector module disconnected from the bracket.
Figure 10:
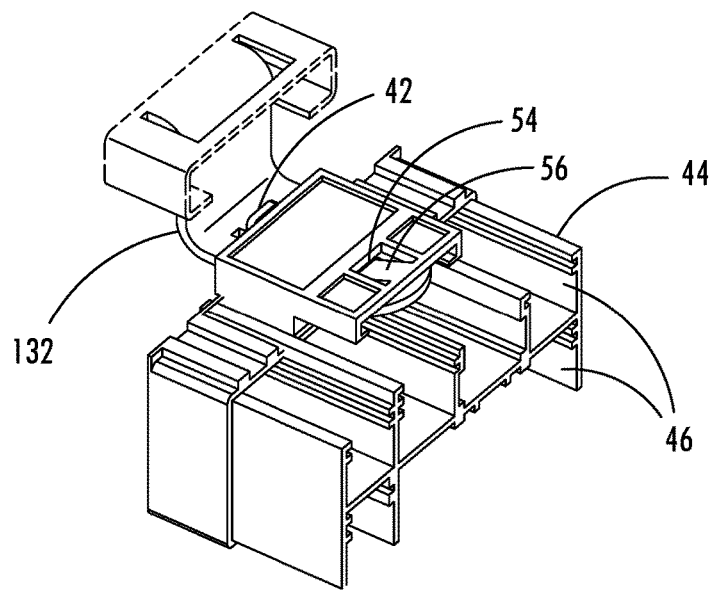
FIG. 10 is an enlarged view of the bracket assembly showing the electrical connector module connected to the bracket.

As seen in FIGS. 9 and 10, each of the brackets 132 includes a tab portion 36 having a snap fit feature 40 and stop member 42 as described above in connection with the first embodiment. The electrical connector module 44 is assembled onto the bracket 132 and the tab portion 36 may be installed within the receiver 50 through opening 52 of the electrical connector module 44 as shown in FIGS. 9 and 10.

Accordingly, the vehicle seat bracket assembly 30 provides for a connection of the electrical connector modules to the underside of a vehicle seat 12 of a vehicle seating assembly 10. The vehicle seat bracket assembly 10 advantageously may connect one or more electrical connector modules 44 each containing one or more electrical control modules in a manner that is efficient and easy to use on vehicle seats that may have any of a number of controllable actuators.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle seat bracket assembly comprising:
 a bracket connected to a vehicle seat cushion tube and comprising one or more retention features comprising an opening formed in the bracket; and
 an electrical connector module receivably connected to the bracket via the one or more retention features and comprising a retention tab engageable into a locking position within the opening to retain the module on the bracket.

2. The bracket assembly of claim 1 further comprising one or more electrical control modules connected to the electrical connector module.

3. The bracket assembly of claim 1, wherein the bracket is connected to a handcuff assembly that is connected to the vehicle seat cushion tube on a bottom side of a seat structure.

4. The bracket assembly of claim 1, wherein the retention tab comprises a depressible tab that forms a snap fit retention within the opening.

5. The bracket assembly of claim 1, wherein the one or more retention features further comprises a stop member configured to engage the electrical connector module.

6. The bracket assembly of claim 1, wherein the bracket comprises a tab portion, and wherein the tab portion is received in a receiver of the electrical connector module and retained by the one or more retention features.

7. The bracket assembly of claim 1, wherein the bracket is directly connected to a handcuff assembly.

8. The bracket assembly of claim 1, wherein the bracket is connected to a member connecting between first and second handcuff assemblies on a bottom side of the seat structure.

9. The bracket assembly of claim 8, wherein the member is integrally formed with the first and second handcuff assemblies.

10. A vehicle seat bracket assembly comprising:
a bracket connected to a handcuff assembly on a vehicle seat cushion tube on a bottom side of a seat and comprising one or more retention features comprising an opening formed in the bracket;
an electrical connector module comprising a retention tab engageable into a locking position within the opening to retain the module on the bracket; and
one or more electrical control modules connected to the electrical connector module.

11. The bracket assembly of claim 10, wherein the retention tab comprises a depressible tab that forms a snap fit retention within the opening.

12. The bracket assembly of claim 11, wherein the retention feature further comprises a stop member configured to engage the electrical connector module.

13. The bracket assembly of claim 10, wherein the bracket comprises a tab portion, and wherein the tab portion is received in a receiver of the electrical connector module and retained by the one or more retention features.

14. The bracket assembly of claim 10, wherein the bracket is directly connected to a handcuff assembly.

15. The bracket assembly of claim 10, wherein the bracket is connected to a member connecting between first and second handcuff assemblies that are connected to the cushion tube.

16. The bracket assembly of claim 15, wherein the member is integrally formed with the first and second handcuff assemblies.

17. A vehicle seat comprising:
a seat structure;
a cushion tube assembled to the seat structure;
a bracket connected via a handcuff bracket to the cushion tube and comprising one or more retention features comprising an opening formed in the bracket; and
an electrical connector module comprising a retention tab engageable into a locking position within the opening to retain the module in the bracket.

18. The bracket assembly of claim 17 further comprising one or more electrical control modules connected to the electrical connector module.

* * * * *